United States Patent

[11] 3,602,065

| [72] | Inventor | Ralph A. Ratcliff<br>614 Mountain View Ave. P.O. Box 543,<br>Belmont, Calif. 94002 |
|---|---|---|
| [21] | Appl. No. | 25,210 |
| [22] | Filed | Apr. 2, 1970 |
| [45] | Patented | Aug. 31, 1971 |

[54] SAFETY LEVER FOR LOAD-SUSTAINING DEVICE
6 Claims, 4 Drawing Figs.

[52] U.S. Cl. ..................................... 274/524,
74/543, 254/167, 287/99
[51] Int. Cl. ........................................ G05g 1/04
[50] Field of Search ............................ 74/543,
523, 524, 584; 254/167, 187 HE; 287/99, 100, 101

[56] References Cited
UNITED STATES PATENTS

| 3,012,446 | 12/1961 | Muehl .......................... | 74/524 UX |
| 3,060,763 | 10/1962 | Newfeld et al. ................ | 74/524 |

*Primary Examiner*—William F. O'Dea
*Assistant Examiner*—F. D. Shoemaker
*Attorney*—Flehr, Hohbach, Test, Albritton & Herbert ABSTRACT: A safety lever for a load-sustaining device which prevents overloading of the device during use. The safety lever is constructed of two cooperable interconnected parts having shear pin means interposed therebetween which will sever upon force applied to the operating lever in excess of a predetermined rated amount. A stop shoulder is included with the lever which restricts movement of the lever in one direction when the shear pin is severed so that operation injury is precluded. Movement of the lever in the opposite direction upon shearing of the shear pin is unrestricted so that the load-sustaining device is rendered inoperable until the shear pin is replaced.

PATENTED AUG 31 1971　　3,602,065
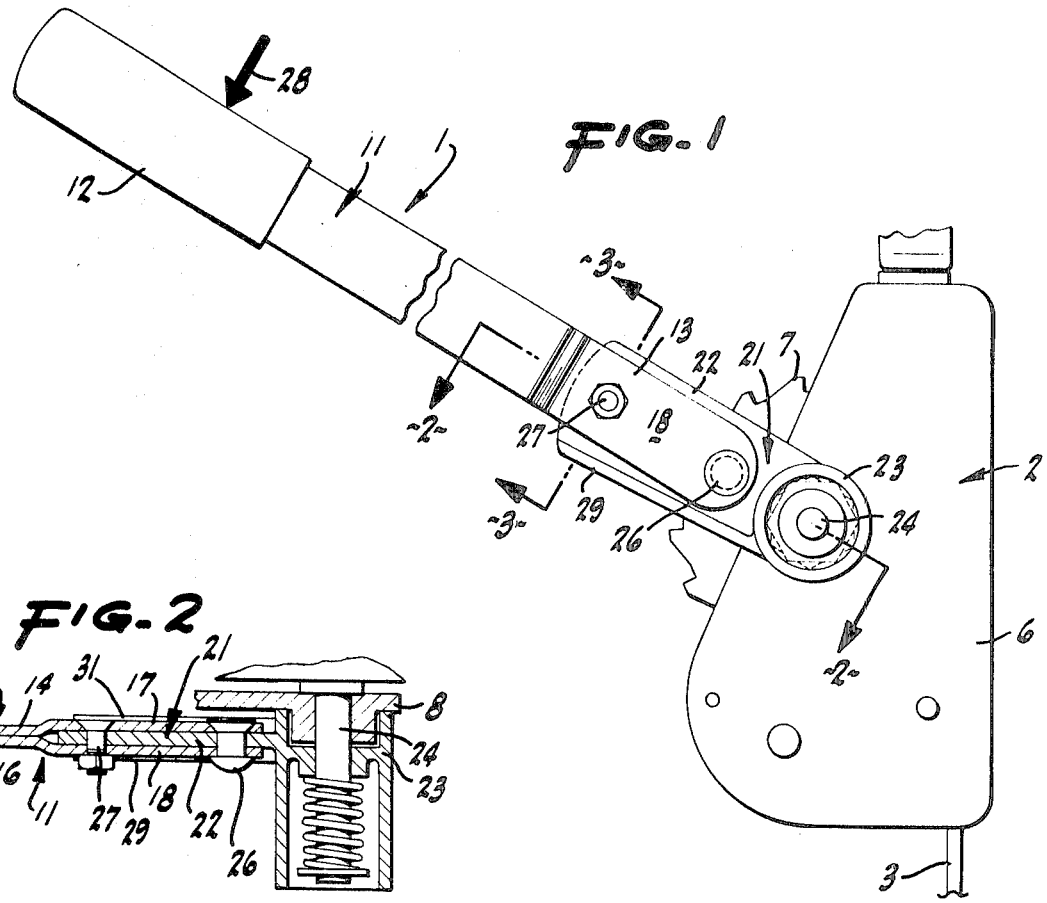
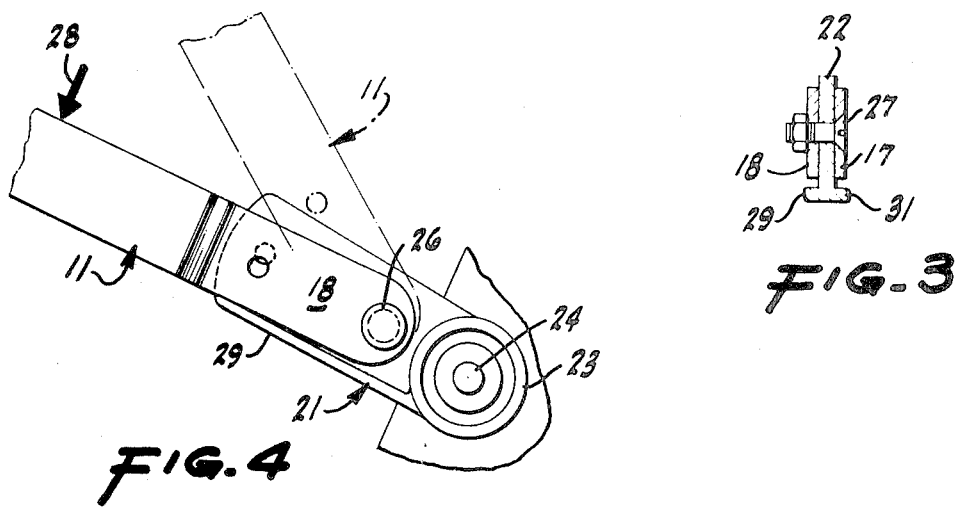
INVENTOR
RALPH A. RATCLIFF
BY Flehr, Hohbach, Nest,
Albritton & Herbert
ATTORNEYS

SAFETY LEVER FOR LOAD-SUSTAINING DEVICE

BACKGROUND OF THE INVENTION

1. Field of the Invention

This invention relates to the field of load-sustaining devices, such as chain and cable hoists, load binders and like devices operated by reciprocating movement of an operating lever. More particularly, this invention relates to the field of safety lever constructions for load-sustaining devices which have built thereinto an automatic overload release feature which precludes the device being overloaded by the operator. Still more particularly this invention relates to the field of safety lever constructions which have built-in shear means which severs when the force applied thereto exceeds a predetermined amount so the operator may not overload the device of which the lever forms a part.

2. Description of the Prior Art

Safety levers for load-sustaining devices have been known generally heretofore. In certain arrangements, safety features are incorporated into a lever which will bend when the rated load applied thereto by the operator is exceeded. Other known devices include levers which incorporate shear plates or the like thereinto which are severed upon the load being applied to the lever exceeds predetermined rated limits.

However, with safety levers of the type known heretofore, including those employing severable shear plates in their construction, it is still possible for the operator to utilize the device after the lever has been subjected to an overload. That is, with prior known safety levers, the device is still operable because the operator can still pivot the operating lever in the two directions necessary to effect operation of the mechanism within the device which sustains the load.

With the present invention, however, shear structure is incorporated into the operating lever which, when severed, requires replacement of the shear structure before the device can be utilized thereafter. With the shear means disclosed herein, limited movement, following shearing thereof, in one direction is possible within predetermined limits so that the operator will not be injured upon such shearing occurring. However, movement of the lever in the opposite direction is unrestrained upon such shearing occurring so that the device is rendered inoperable because the operating mechanism within the device cannot be actuated. Thus the entire device is rendered inoperable until the shear structure is replaced, thereby imparting the lever of this invention with true and effective safety characteristics.

So far as is known, the particular safety lever construction disclosed herein has not been known in the art heretofore with load-sustaining devices or analogous devices of any type.

SUMMARY OF THE INVENTION

This invention relates to an improved safety lever construction. More particularly, this invention relates to a pivotal lever construction employed in conjunction with a load-sustaining device, such as a chain sr cable hoist or load binder. Still more particularly, this invention relates to a safety lever construction for a load-sustaining device which includes shear means which is severable upon the lever being subjected to a force in excess of a predetermined rated amount. Still more particularly, this invention relates to a safety lever construction defined by cooperable interengaged parts operatively interconnected by severable shear structure, such parts being movable relative to each other a predetermined limited distance in one direction upon such shearing occurring and being movable relative to each other in the opposite direction a substantially unrestricted distance following such shearing, so that the device is rendered inoperable until the severed shear structure is replaced.

With the present invention, an operator is protected from harm should he apply a force to the operating lever in excess of the predetermined rated amount because the lever can travel only a limited distance following shearing of the safety shear structure; that is, the lever cannot "fly" when the shear structure is severed abruptly. Further utilization of the device cannot be effected until a similar shear structure is replaced in the operating lever.

With prior known safety lever constructions included in load-sustaining devices, such devices were still usable, with some inconvenience, following the lever being subjected to an excess force. Thus, the operator could continue to place himself and those working with him in jeopardy by overloading the device even after the safety lever had performed its intended function. With the present safety lever arrangement, the operator is fully protected against overloading of the load-sustaining device because the operating lever construction of this invention becomes completely inoperable when a predetermined rated lever force load has been exceeded.

From the foregoing it should be understood that objects of this invention include the provision of an improved safety lever construction for a load-sustaining device; the provision of an improved shearable operating lever for a load-sustaining device; the provision of an improved safety lever construction for a load-sustaining device which renders the device inoperable upon the lever being subjected to a force in excess of a predetermined rated amount; and the provision in a safety lever construction for a load-sustaining device which may be easily and readily returned to the operative condition upon shearing of the safety structure incorporated therein.

These and other objects of this invention will become apparent from the following description in which reference is directed to the attached drawings.

BRIEF DESCRIPTION OF THE DRAWINGS

FIG. 1 is a side elevational view of the safety lever construction of this invention shown in conjunction with an exemplary load-sustaining device.

FIG. 2 is a generally horizontal sectional view through a portion of the lever construction of this invention taken in the plane of line 2—2 of FIG. 1.

FIG. 3 is a generally vertical cross-sectional view through the lever construction taken in the plane of line 3—3 of FIG. 1.

FIG. 4 is a side elevational view corresponding generally to FIG. 1 showing the condition of the operating lever after the same has been subjected to an overload by the operator of the load-sustaining device.

DESCRIPTION OF THE PREFERRED EMBODIMENTS

Before describing details of the improved safety lever construction of this invention, it should be noted that such construction may be incorporated into load-sustaining devices of various constructions. For example, it may be utilized in conjunction with pawl and ratchet chain hoists, friction brake chain hoists, pawl and ratchet cable hoists, load binders, and other related load sustaining devices in which a load is engaged with a load-supporting element, such as a chain, cable or tape, and is raised, lowered or otherwise moved or restrained in response to actuation of the operating mechanism positioned within the housing of the device by reciprocal movement of an operating lever.

The exemplary load-sustaining device generally shown in FIG. 1 corresponds to the construction shown in applicant's copending application Ser. No. 25,190 filed Apr. 2, 1970 entitled "Improved Cable Hoist." However, such showing is for purposes of background illustration only and utilization of the invention disclosed herein is not restricted to use in such an exemplary arrangement but may be employed in conjunction with various types of devices as noted previously.

Referring to FIG. 1, the improved safety lever construction of this invention is generally designated 1 and is shown operatively connected with a load-sustaining device, generally designated 2, having a load-sustaining cable 3 projecting and depending from the housing 6 thereof. Positioned generally within the housing is the operating mechanism (not shown) of the device which may take various forms, as is well known in the loadesustaining art.

In that regard, the exemplary device illustrated is a cable-type hoist of the pawl and ratchet type which includes in its operating mechanism a ratchet wheel 7, partially shown in FIG. 1, which is rotatable in selective clockwise and counterclockwise directions in response to actuation of the operating lever 1 through the operating mechanism of the device to wind or unwind cable 3 on a spool in the manner well known in the cable hoist art. In that regard, the operating lever is connected, as described in greater detail in the aforementioned copending application, with a polygonal boss member generally designated 8, as seen in FIG. 2, which in turn forms part of the overall lever structure of the device which is operatively connected with the ratchet wheel 7 and the remaining operative components of the operating mechanism in the manner described in said copending application. Thus, upon reciprocation of the operating lever 1 in opposite clockwise and counterclockwise directions, a load connected with the cable may be selectively raised or lowered in known fashion.

The construction of the subject safety lever is seen in FIGS. 1 and 2 and such lever comprises a first elongated handle member 11 having a gripping portion 12 defined by a handle grip or rubber or the like on one end thereof which is to be manually grasped by the operator of the device. At its other end, the handle member 11 is defined by a connecting portion 13 formed to corporate with and be integrally connected to a second handle member to be described.

In the embodiment illustrated, the first handle member 11 is defined by two elongated plates 14 and 16 which, for the major portion of their lengths, are joined together into face to face contacting relationship by welding or the like as seen in FIG. 2. However, at the connecting end portion 13 thereof, such plates are bent to be laterally spaced from each other and thereby define generally parallel-spaced arms 17 and 18 which impart a forked configuration to the connecting end portion 13 of the first handle member.

The subject lever construction includes the second handle member mentioned previously, designated 21. Such second handle member comprises an elongated plate 22 which is generally flat for the major portion of its length but which terminates in an integral enlarged hollow cylindrical boss 23 having a star socket therein which forms part of the structure by which the operating lever of this invention is operatively connected through polygonal boss 8 with the operating mechanism of the load-sustaining device in the manner disclosed in greater detail in the aforementioned copending application.

As such interconnection forms no part of this invention, because the second handle member may be operatively connected in various ways with various operating mechanisms, details of that interconnection have not been described herein. It should be understood, however, upon pivotal movement of the second handle member 21 about the axis of a shift 24 extending therethrough upon which boss 8 is mounted, that such movement will transmit movement to the polygonal boss 8 interengaged with the second handle member and will result in actuation of the operating mechanism of the load-sustaining device in the manner known in the art. Thus, a load supported by the load-sustaining device may be moved or otherwise restrained in known fashion as lever 1 is selectively oscillated.

The generally flat plate portion 22 of the second handle member 21 defines the connecting portion thereof by means of which the first and second handle members are operatively interconnected. In that regard, as seen in FIGS. 2 and 3, the spaced arms 17 and 18 of the first handle member are positioned to straddle in contacting relationship the plate portion 22 of the second handle member.

The first and second connecting portions of the respective handle members are interconnected operatively with each other by means of a pivot pin 26 which is positioned through appropriate holes formed in the respective arms 17 and 18 of the first handle member and the plate portion 22 of the second handle member. The pivot pin permanently interconnects the first and second handle members but permits pivotal movement relative thereto under certain conditions in the manner seen in FIG. 4.

Normally any such pivotal movement between the first and second handle members is positively precluded so that the operating mechanism of the load-sustaining device may be actuated to raise or lower or otherwise support a load as noted previously. Such interconnection is effected by means of shear structure in the form of a shear pin 27 positioned through appropriate holes formed in arms 17 and 18 and plate 22. In that regard, the term shear pin as used herein is meant to include a severable connecting pin riveted in place or one comprising a threaded nut and bolt arrangement as shown in FIGS. 2 and 3. In that connection, the threaded nut and bolt shear construction shown is preferred because it permits ready replacement of the shear structure in the field whereas a rivet-type shear structure requires special tools for permitting replacement which might not be available in the field.

In any event, the shear pin structure 27 utilized is selected to sever when the force applied thereto by the operating handle member 11 direction of the arrow 28 in FIGS. 1 and 4 exceeds a predetermined amount. That is, load-sustaining devices are normally rated as to their safe capacity and the shear pin 27 is selected so that the same will sever when force is applied to the operating lever 1 which would permit the device to be overloaded. Thus, the shear structure is designed so that it will not permit the load to be sustained by the device to exceed its rated capacity.

Referring to FIG. 4, the subject safety lever further comprises safety stop means which will prevent the first handle member 11 from moving more than a predetermined amount should an operator applying excess force to the lever in an attempt to raise an overload. In that manner the danger of injury to the operator is precluded because the first handle member cannot "fly," that is, unrestrained, upon abrupt shearing of the shear pin 27. Such stop means in the embodiment illustrated comprises a stop shoulder 29 provided along one marginal edge of the second handle member 21. The configuration of the second handle member lends itself to the inclusion also of a second stop shoulder along the opposite marginal edge of the plate 22 as seen as FIG. 3. Such second stop shoulder is designated 31.

Thus, upon shear pin 27 being severed by the application of excess force thereto, each of the arms 17 and 18 of the first handle member will engage a stop shoulder to limit unrestrained movement of the first handle member 11 beyond the solid line position shown in FIG. 4. Thus, if an operator using the load-sustaining device is working in a precarious position, such as upon a utility pole or the like, should the shear pin sever, there is no danger that the sudden release of the shear pin will result in the operator losing his balance due to excessive unrestrained movement of the first handle member in the counterclockwise direction seen in FIG. 4.

A further important feature of this invention resides in the fact that generally unrestricted rotation of the first handle member in opposite direction (clockwise in FIG. 4) once shear pin 27 has been severed is permitted. That is, after severing of the shear structure the first handle member 11 may be moved freely to the dotted line position shown in FIG. 4. This free movement about the axis of pivot pin 26 will have no effect on the operating mechanism of the load-sustaining device. That is, because the first handle member 11 is free to rotate substantially unrestrained in the clockwise direction shown in FIG. 4, no motion can be transmitted to the internal operating mechanism of the device. As a result, the device is rendered totally inoperative.

Before the load-sustaining device can be used following shearing of the shear pin 27, it is necessary to replace the shear pin to again make the device operative. Thus, the present lever construction possesses true safety features which positively prevent overloading.

Having thus made a full disclosure of this invention, reference is directed to the appended claims for the scope of protection to be afforded thereto.

I claim:

1. A safety lever construction for a load sustaining device, such as a hoist, comprising
   A. a manually graspable first handle member to be moved in opposite directions by the operator of the device during use thereof,
   B. a second handle member operatively connected with the operating mechanism of said device for transmitting motion therefrom upon movement of said first handle member, and
   C. means operatively interconnecting said first and second handle members including
      1. a pivot pin extending through contacting portions of said handle members,
      2. shear means engaged between said contacting portions of said handle members, and
      3. stop structure on at least one of said handle members which permits limited movement of said handle members relative to each other about the axis of said pivot pin in one direction upon severance of said shear means in response to excess force being applied to said one handle member,
      4. said handle members being unrestrained against movement in an opposite direction upon severance of said shear means so that said handle may not be used to operate said device until said shear means is replaced.

2. The lever construction of claim 1 in which said stop structure permitting limited relative movement between said handle members comprises
   a. a stop shoulder formed on said second handle member which is adjacent to but spaced from a margin of said first handle member,
   b. said stop shoulder limiting movement of said first handle member upon severance of said shear means to prevent injury to the operator of said device upon such shearing occurring.

3. The lever construction of claim 1 in which said shear means comprises
   a. a replaceable shear pin extending through contacting portions of said handle members.

4. A safety lever construction for a load-sustaining device, such as a hoist, comprising
   A. a manually graspable first handle member to be moved in opposite directions by the operator of the device during use thereof, comprising
      1. a gripping portion at one end thereof, and
      2. a connecting portion at the other end thereof,
   B. a second handle member in operative engagement with said first handle member, comprising
      1. a connecting portion at one end thereof in operative contact with said connection portion of said first handle member, and
      2. structure at the other end thereof for operatively connecting said second handle member with the operating mechanism of said device so that movement of said lever may be transmitted to said mechanism for operating the same, and
      3. a stop shoulder along one margin of said second handle member, and
   C. means operatively interconnecting said connecting portions of said first and second handle members comprising
      1. a pivot pin extending through said connecting portions of said handle members about the axis of which said first handle member may move a limited distance in one direction until it strikes the stop shoulder on said second handle member, and about which said first handle member may move a substantially unlimited distance in the opposite direction, and
      2. a replaceable shear pin spaced from said pivot pin also extending through said connecting portions of said handle members,
      3. said shear pin being selected to sever upon force beyond a predetermined limit being applied thereto by said one handle member being urged in said one direction by the operator of said device with said stop shoulder limiting movement of said handle members relative to each other upon such severance occurring to obviate injury to said operator.

5. The lever construction of claim 4 in which said connecting portion of said one handle member comprises
   a. a pair of generally parallel spaced arms imparting a forked construction thereto, and in which said connecting portion of said second handle member comprises
   b. a plate portion received between said spaced arms of said first handle member with said pivot pin an shear pin extending through said arms and said plate portion.

6. The lever construction of claim 5 in which said second handle member includes
   4. a second stop shoulder aligned with said first stop shoulder on said second handle member along an opposite side thereof,
   5. said respective stop shoulders being positioned to be engaged by the respective arms of said first handle member upon severance of said shear pin.